Oct. 4, 1927.
W. O. UNDERWOOD
1,644,405
AUTOMOBILE BODY
Filed May 26, 1926
2 Sheets-Sheet 1
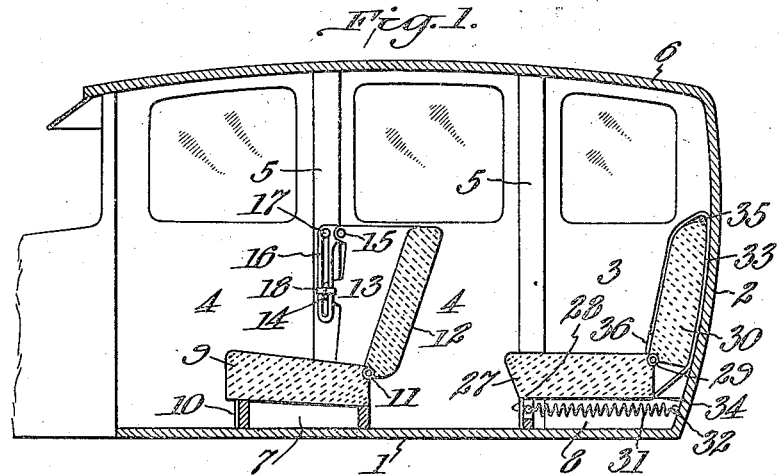
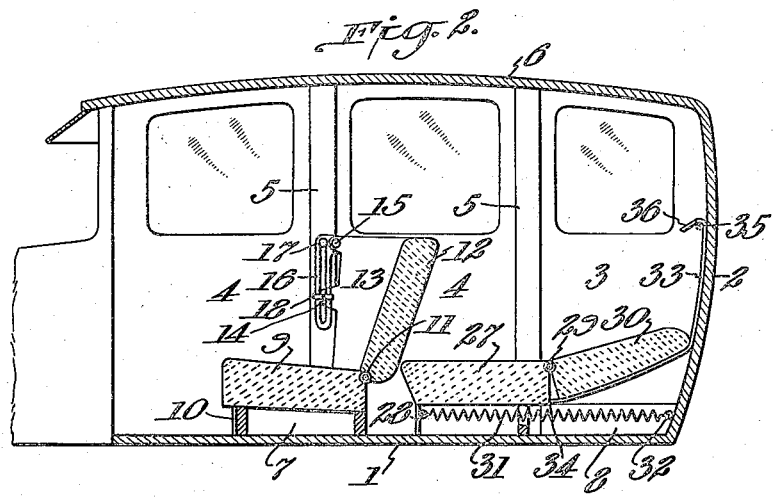
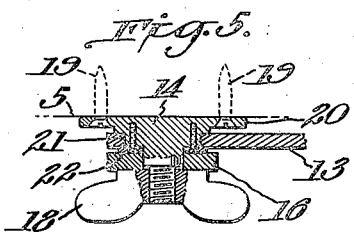
Inventor
Walter O. Underwood
By B. A. Holzberg
Attorney

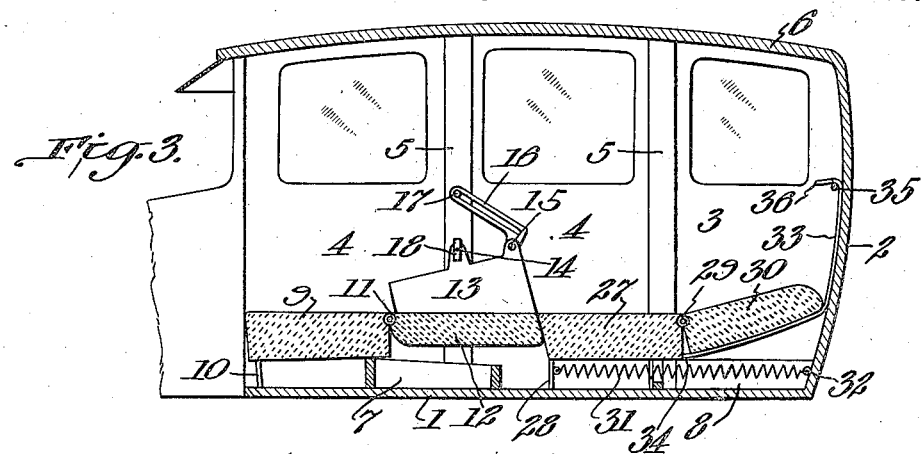
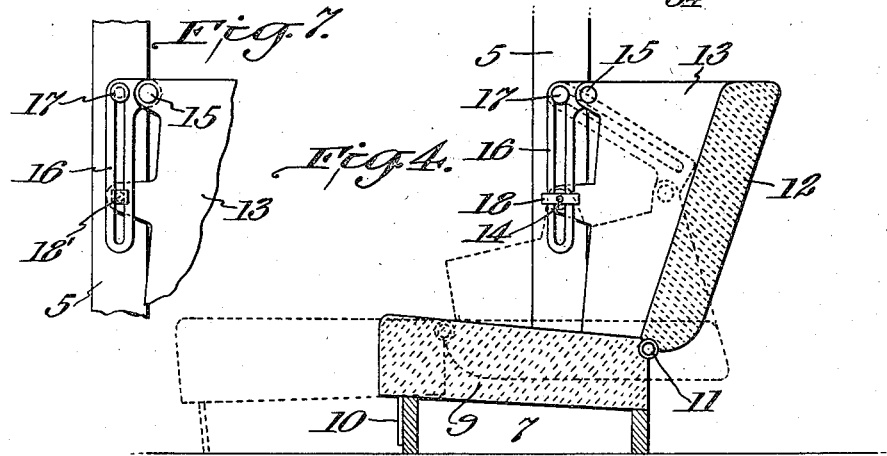
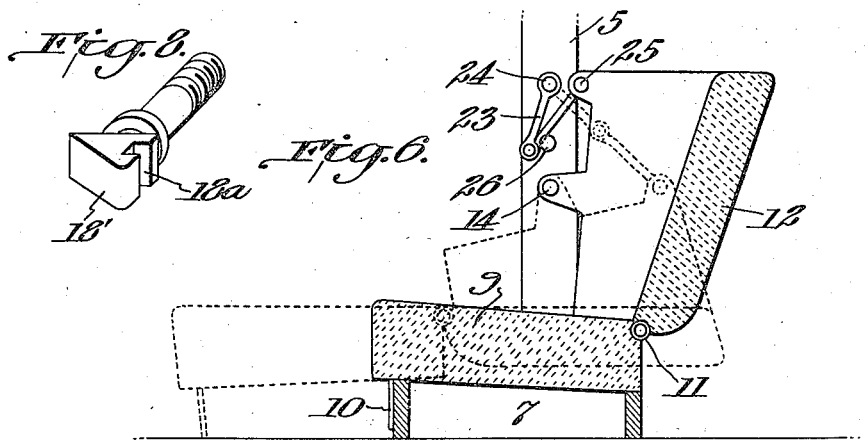

Patented Oct. 4, 1927.

1,644,405

UNITED STATES PATENT OFFICE.

WALTER O. UNDERWOOD, OF GREENFIELD, MISSOURI, ASSIGNOR OF ONE-THIRD TO RALPH E. DUFFY AND ONE-THIRD TO ROBERT D. PAYNE, BOTH OF GREENFIELD, MISSOURI.

AUTOMOBILE BODY.

Application filed May 26, 1926. Serial No. 111,776.

This invention relates to vehicle bodies, and particularly to automobile bodies of the two seated type, especially enclosed bodies such as limousines and sedans or the like.

The object of the invention is to so modify the construction and means of support of the seats, and particularly of their bottoms and backs or seat and back cushions, that they may be shifted to positions to form a bed or berth.

The invention consists, broadly, in a vehicle body having seats the bottoms and backs of which are so associated and mounted that they may be moved from seat-forming to berth-forming or reclining position, and in means whereby the said bottoms and backs may be fixedly held in either of such positions, as I will proceed now to explain and finally claim.

In the accompanying drawings illustrating the invention, in the several figures of which like parts are similarly designated, Figure 1 is a central longitudinal vertical section through an automobile body of the sedan type provided with seats embodying my invention, and showing the seats in normal seat-forming position. Fig. 2 is a view similar to Fig. 1, but showing the bottom and back of the rear seat shifted to position to form a bed or berth in the rear portion of the body. Fig. 3 is a view similar to Fig. 1, but showing both seats shifted to position to form a full-sized bed or berth occupying approximately the full interior space of the body. Fig. 4 is an enlarged sectional view showing the front seat and its supporting and positioning means in seat-forming position and in berth-forming position, in full and dotted lines respectively. Fig. 5 is a detail sectional elevation, on a greatly enlarged scale, of the thumb-nut and link for holding and fixing the back of the front seat in seat-forming position. Fig. 6 is an enlarged sectional view illustrating a modified form of the invention. Fig. 7 is an enlarged view of a modified means for holding the link in fixed position. Fig. 8 is a greatly enlarged detail view of the latch member of Fig. 7.

The body has the usual floor 1, rear walls 2, side walls 3, doors 4, uprights 5 and top 6, and the floor 1 is provided with the ordinary box-like seat supports 7 and 8 which provide storage space for tools and accessories.

The front seat support 7 carries the seat cushion or bottom 9 which is provided with legs 10, normally lying flat against the front of the support 7 and has hinged to its upper back edge as at 11 the seat back or back-cushion 12. This back-cushion is provided on its lateral edges with pivotal members 13 fulcrumed as at 14 on the uprights 5 at opposite sides of the body, and each of the members 13 has pivoted to it as at 15 a link 16 slidably engaging the shank of a clamping screw 17 attached to the adjacent upright 5. When the front seat is in the position shown in Figs. 1 and 2, and in full lines in Fig. 4, the links 16 may be engaged either by thumb-nuts 18 (Fig. 5) or the latch members 18' (Figs. 7 and 8) whereby movement of the links upon screws 17 is prevented and the seat back thereby held rigidly in seat-forming position.

The thumb-nuts 18 and their mountings may take the form shown in Fig. 5 wherein the pivot member 14 is secured to the upright 5 by means of screws 19 passing through an attaching plate 20. A bearing 21 is provided for the member 13 and the proper relationship between this member 13 and its bearing 21 is maintained by a suitable washer 22 which also forms a surface against which the link 16 may slide and against which it may be held by tightening of the thumb-nut 18. As will be seen, particularly by reference to Figs. 3 and 4, the thumb-nut is of such a width that the slot of the link 16 will pass over it when in alignment with it, but when it is turned to a position normal to the length of the link, the link is held by the nut and may be thereby secured against movement.

Where the latch members 18' (Figs. 7 and 8) are used the slots of links 16 will engage the notches 18ª of the latch members automatically when the seat back is raised to seat-forming position, and as the pressure of a seated person against the back has a tendency to move the seat back upon its pivots 14, the links 16 because of their leverages, will be securely engaged with the notches 18ª of the latch members 18'.

In adjusting the front seat from seat-forming position to berth-forming or reclining position, it is merely necessary to turn the thumb-nuts 18 to such a position that the links 16 may be removed from engagement with the nuts, or to disengage the slots of the links from notches 18ª. Then the seat cushion 9 is preferably raised and pulled forward to the position shown in Fig. 3, and in dotted lines in Fig. 4, and, through its hinge connection 11 with the seat back 12 will turn the back upon its pivot 14 until it assumes the position of Fig. 3, the links 16 meanwhile sliding upon clamping screws 17 until movement is arrested by contact of the ends of the slots of the links with the shanks of the screws 17. In the position of the links and screws last mentioned, these parts form a rigid support for the seat back in berth-forming position, the seat bottom 9 being at the same time rigidly supported by its legs 10 and the front edge of the support 7.

In place of the slotted links 16 and their associated parts, I may use the modified form of support illustrated in Fig. 6 whereng jointed links 23 having rigid pivots at 24 and 25 are substituted for the slotted sliding links 16, the seat back being held in seat-forming position by means of stop pins 26 which engage with the folded links.

Obviously chains or cords or straps might be substituted for the slotted links 16 or the jointed links 23.

If desired, the clamping screws 17 may be tightened when the seat is in either of its positions to secure the links 16 against movement.

The rear seat has a seat cushion 27 normally carried by the support 8 and is provided with legs 28. This cushion 27 is hinged as at 29 to the back cushion 30 which is normally supported by the back 2 of the body. Springs 31 are attached to the seat cushion, as by means of the legs 28, and to the back 2 of the body, as at 32, to normally hold the seat in seat-forming position and also to assist in sliding the two cushions 27 and 30 from berth-forming position to seat-forming position. In order to further aid in this sliding of the cushions 27 and 30 I provide a strap 33 attached at one end, as at 34, to the seat cushion or bottom and passing through a staple 35 carried by the back 2 of the body. By pulling upon the end 36 of this strap it will be apparent that, as it slides through the staple 35, the cushions 27 and 30 will be moved from the position shown in Figs. 2 and 3 to the position shown in Fig. 1.

When the space behind the back seat will permit, the springs 31 may be attached to the rear edge of the seat cushion 27 instead of to the legs 28.

It will be noted that cushions 27 and 30 are so proportioned that when in berth-forming position the rear end of cushion 30 is slightly elevated so as to form a sort of pillow or head-rest.

Obviously either seat may be adjusted in berth-forming or reclining position independently of the other, and this is particularly advantageous when it is desired to form a berth for children in the rear compartment of the body by lowering the rear seat, as shown in Fig. 2, while the vehicle is being driven from the front seat.

When both seats are adjusted to the berth-forming or reclining position, as shown in Fig. 3, a full-length berth of ample width to accommodate two adults is formed.

It will thus be seen that I provide a very simple and convenient arrangement whereby the seats of a vehicle may be made to serve as a berth or bed without necessitating the lifting or turning of the seat cushions, but merely by shifting them from one position to another. And this may be done without the necessity of getting out of the vehicle.

Various changes are contemplated as within the spirit of the invention and the scope of the following claims.

What I claim is:—

1. A seat for vehicle bodies, having a bottom and a back jointly movable from seat-forming to reclining position, means carried by said back and pivoted to said body whereby said back may be moved from one to the other of said positions, a slotted link carried by said back and having its slot engaging a member fixed to said body, and means fixed to said body and engageable with the slot of said link for locking said seat in seat-forming position.

2. A seat for vehicle bodies, having a bottom and a back jointly movable from seat-forming to reclining position, means carried by said back and pivoted to said body whereby said back may be moved from one to the other of said positions, a slotted link carried by said back and having its slot engaging a member fixed to said body, and means fixed to said body and automatically engageable with the slot of said link for locking said seat in seat-forming position.

In testimony whereof I have hereunto set my hand, this 25th day of May, A. D. 1926.

WALTER O. UNDERWOOD.